US010073776B2

(12) United States Patent
Srinivasan et al.

(10) Patent No.: US 10,073,776 B2
(45) Date of Patent: Sep. 11, 2018

(54) SHADOW TAG MEMORY TO MONITOR STATE OF CACHELINES AT DIFFERENT CACHE LEVEL (71) Applicant: Advanced Micro Devices, Inc., Sunnyvale, CA (US)

(72) Inventors: Sriram Srinivasan, Fort Collins, CO (US); William L. Walker, Fort Collins, CO (US)

(73) Assignee: Advanced Micro Device, Inc., Santa Clara, CA (US)

( * ) Notice: Subject to any disclaimer, the term of this patent is extended or adjusted under 35 U.S.C. 154(b) by 52 days.

(21) Appl. No.: 15/190,607

(22) Filed: Jun. 23, 2016

(65) Prior Publication Data

US 2017/0371786 A1    Dec. 28, 2017

(51) Int. Cl.
*G06F 12/0811* (2016.01)
*G06F 12/0815* (2016.01)
*G06F 12/084* (2016.01)
*G06F 12/0842* (2016.01)

(52) U.S. Cl.
CPC ........ *G06F 12/0811* (2013.01); *G06F 12/084* (2013.01); *G06F 12/0815* (2013.01); *G06F 12/0842* (2013.01); *G06F 2212/1016* (2013.01); *G06F 2212/6042* (2013.01)

(58) Field of Classification Search
CPC ............. G06F 12/0811; G06F 12/0815; G06F 12/084; G06F 2212/621; G06F 2212/283; G06F 12/0817; G06F 12/0842; G06F 12/0808; G06F 2212/1041; G06F 9/3834; G06F 2212/205; G06F 2212/1016; G06F 2212/6042
See application file for complete search history.

(56) References Cited

U.S. PATENT DOCUMENTS

| 5,297,269 | A | 3/1994 | Donaldson et al. |
| 5,897,656 | A | 4/1999 | Vogt et al. |
| 6,018,763 | A | 1/2000 | Hughes et al. |
| 6,622,214 | B1* | 9/2003 | Vogt ..................... G06F 12/0833 711/124 |
| 7,146,468 | B2 | 12/2006 | Hardage, Jr. |
| 7,213,106 | B1 | 5/2007 | Koster et al. |
| 7,836,262 | B2* | 11/2010 | Gunna ................ G06F 12/0804 711/118 |
| 9,268,697 | B2 | 2/2016 | Pardo et al. |
| 9,298,643 | B2 | 3/2016 | Tran et al. |

(Continued)

OTHER PUBLICATIONS

International Search Report and Written Opinion correlating to PCT/US2016/052607 dated Mar. 16, 2017, 13 pages.

(Continued)

*Primary Examiner* — Hashem Farrokh (57) ABSTRACT

A processing system includes a plurality of processor cores and a plurality of private caches. Each private cache is associated with a corresponding processor core of the plurality of processor cores and includes a corresponding first set of cachelines. The processing system further includes a shared cache shared by the plurality of processor cores. The shared cache includes a second set of cachelines, and a shadow tag memory including a plurality of entries, each entry storing state information for a corresponding cacheline of the first set of cachelines of one of the private caches.

22 Claims, 7 Drawing Sheets

(56) References Cited

U.S. PATENT DOCUMENTS

| | | | |
|---|---|---|---|
| 9,542,316 B1* | 1/2017 | Forrest | G06F 12/0815 |
| 9,727,466 B2* | 8/2017 | Tune | G06F 12/0833 |
| 2005/0154832 A1* | 7/2005 | Steely, Jr. | G06F 12/0808 |
| | | | 711/133 |
| 2006/0080512 A1 | 4/2006 | Hoover et al. | |
| 2006/0224837 A1 | 10/2006 | Blumrich et al. | |
| 2008/0098177 A1 | 4/2008 | Guthrie et al. | |
| 2010/0070712 A1 | 3/2010 | Arimilli et al. | |
| 2010/0146209 A1 | 6/2010 | Burger et al. | |
| 2013/0042078 A1* | 2/2013 | Jalal | G06F 12/0815 |
| | | | 711/146 |

OTHER PUBLICATIONS

European Search Report dated May 31, 2017 in EP Application No. 16201256.1, 4 pages.

Examination Report dated Apr. 19, 2018 for EP Application No. 16201256.-11221, 6 pages.

* cited by examiner

SHADOW TAG MEMORY TO MONITOR STATE OF CACHELINES AT DIFFERENT CACHE LEVEL

BACKGROUND

Description of the Related Art

Processing systems typically utilize data caching to accelerate access to data stored in system memory. The data caching is implemented in the form of a cache hierarchy in which multiple levels of caches are used to temporarily store data accessed from the system memory. Coherency protocols often are implemented in such multiple level caches to ensure that a processor core does not operate on cached data that has become stale or otherwise invalid. However, in exclusive caching implementations (that is, where a valid cacheline is permitted to be cached at only one level of the cacheline), conventional caching techniques often lead to excessive probe traffic for implementing the coherency protocols, and thus may impact caching performance.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate a processing system utilizing a shadow tag memory to provide for efficient caching operations. The processing system implements one or more compute complexes, each compute complex having multiple processor cores and a cache hierarchy which has two or more levels of caches. Each processor core is associated with one or more levels of caches that are private to a corresponding core (hereinafter, the "private caches"). The processing system further implements a cache at another level and which is shared among the processor cores of the compute complex (hereinafter, the "shared cache"). The controller of the shared cache maintains address and state information for cachelines of the private caches in a shadow tag memory. This state information includes, for example, coherency information for the cacheline for each of the private caches, as well as information regarding prior history of the cacheline at the private caches. Such coherency information includes, for example, an indicator of a coherency state from a set of coherency states that is a superset of the set of coherency states implemented by the private caches. With this shadow tag memory, the shared cache is able to filter probes sent to the private caches based on lines present in the shadow tag memory. If a probed line is not present in the shadow tag memory, the probe does not need to be sent to the private cache and thus is filtered out by the shared cache. This probe filtering reduces probe traffic to the private caches within the compute complex for probes that originate from within the compute complex or between the compute complex and the system at large. In some embodiments, the shadow tag memory also tracks the state of cachelines of the private caches with higher granularity, as well as process a cacheline fill request from the private cache level and its associated cacheline victim request more efficiently.

Figure 1:
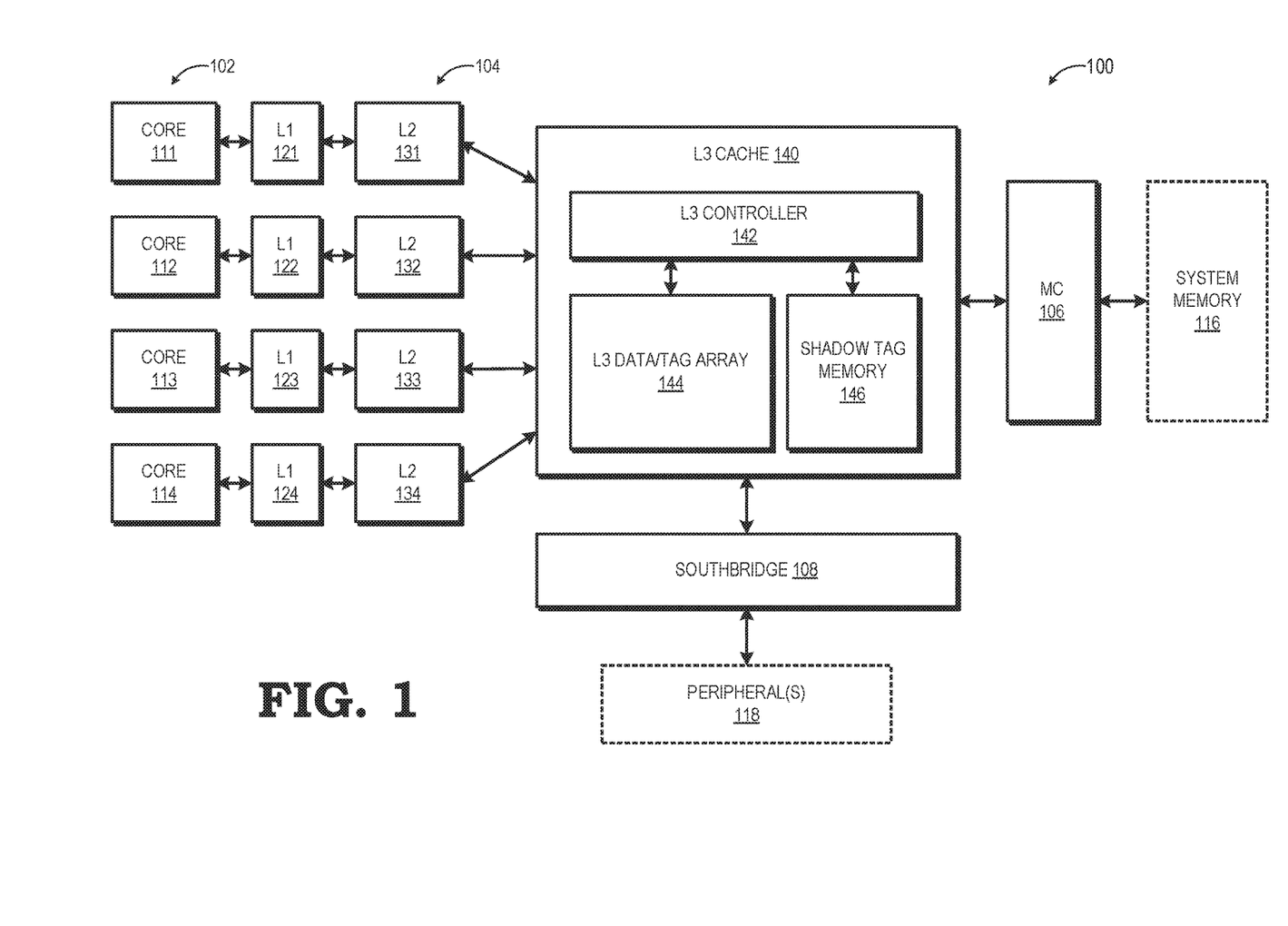
FIG. 1 is a block diagram of a processing system utilizing a shadow tag memory in accordance with some embodiments.

FIG. 1 illustrates a processing system 100 utilizing shadow tag memory in accordance with at least some embodiments. In the depicted example, the processing system 100 includes a compute complex 102, a cache hierarchy 104, a memory controller 106, and a southbridge 108. The compute complex 102 includes a plurality of processor cores, such as the four processor cores 111, 112, 113, 114 depicted in this example. The processor cores comprise, for example, central processing unit (CPU) cores, graphics processing unit (GPU) cores, digital signal processor (DSP) cores, or a combination thereof. It will be appreciated that the number of processor cores of the compute complex 102 may be fewer or more than four.

The memory controller 106 operates as the interface between the cache hierarchy 104 and a system memory 116. Thus, data to be cached in the cache hierarchy 104 typically is manipulated as blocks of data referred to as "cachelines", and which are addressed or otherwise located in a memory hierarchy using a physical address of system memory 116. Cachelines are accessed from the system memory 116 by the memory controller 106 in response to memory requests from the cache hierarchy 104. Likewise, when a cacheline containing modified data is evicted from the cache hierarchy 104 and thus needs to be updated in the system memory 116, the memory controller 106 manages this write-back process. The southbridge 108 operates as the interface between the cache hierarchy 104, the memory controller 106, and one or more peripherals 118 of the processing system 100 (e.g., network interfaces, keyboards, mice, displays, and other input/output devices).

The cache hierarchy 104 includes two or more levels of caches. In the illustrated example, the cache hierarchy 104 includes three cache levels: level 1 (L1); level 2 (L2), and level 3 (L3). For L1, the core complex 102 implements small private caches for each processing core, which are depicted as L1 caches 121, 122, 123, 124, each associated with a corresponding one of processor cores 111-114 as depicted in FIG. 1.

For L2, the core complex 102 implements larger private caches for each processor core, which are depicted as L2 caches 131, 132, 133, 134 corresponding to processor cores 111-114, respectively, as also illustrated in FIG. 1. Each of the L2 caches 131-134 is private to its corresponding processor core, but the cache hierarchy 104 operates to maintain coherency between the L2 caches 131-134. The L2 caches 131-134 can be direct mapped or an n-way set associative cache in some embodiments.

For the L3 caching level, the cache hierarchy 104 implements an L3 cache 140 that is shared by the processor cores of the compute complex 102, and thus shared by at least the L2 caches 131-134. The L3 cache 140 implements an L3 controller 142, a L3 data array comprising a plurality of indexes and a plurality of corresponding ways, each way to store a corresponding cacheline at the corresponding index, and an L3 tag array to store the tag information associated with each index/way. The L3 data array and L3 tag array are collectively illustrated, and referred to herein, as L3 data/tag array 144.

The L3 cache 140 further includes a shadow tag memory 146 to store address and state information for cachelines of the L2 caches 131-134 (that is, to store "shadow tags" representative of the tag information of the L2 caches 131-134). To this end, the shadow tag memory 146 is implemented as a cache, array, table, latches, flops, or other storage configuration so as to include shadow tag entries hierarchically arranged as a plurality of "banks", a plurality of indices, and a plurality of ways. That is, each entry in the shadow tag memory 146 corresponds to a particular bank, index and way combination. Each shadow tag entry in the shadow tag memory 146 tracks information for a corresponding cacheline present in one of the L2 caches 31-134. The information stored at a shadow tag entry for the corresponding cacheline includes, for example, the physical address (or portion thereof) of the cacheline as well as state of the cacheline at the L2 cache. Each bank contains a plurality of indices and ways and represents the shadow tag entries used to track the cachelines present in one of the L2 caches. Thus, for the example of FIG. 1, the shadow tag memory 146 includes four "banks," one for each of the four L2 caches 131-134.

Figure 2:
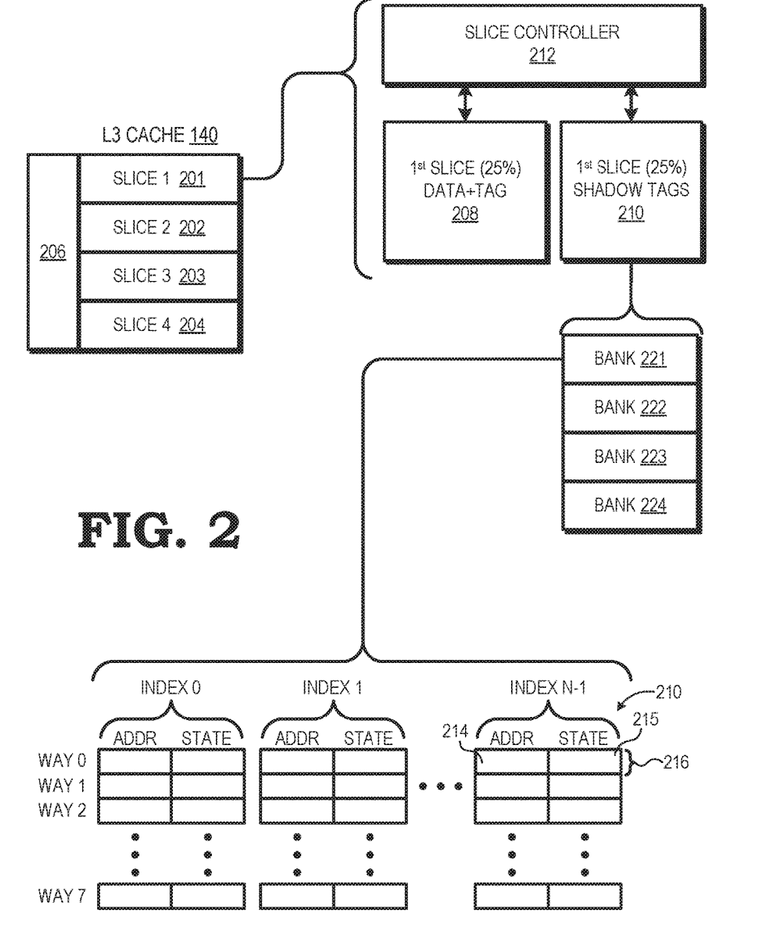
FIG. 2 is a block diagram of a level 3 (L3) cache with a shadow tag memory for storing state information for level 2 (L2) caches in accordance with some embodiments.

To illustrate, FIG. 2 depicts an example implementation of the L3 cache 140 in accordance with some embodiments. The L3 cache 140 is segmented into a plurality of "slices", with the illustrated example having four slices 201, 202, 203, 204 (also denoted as slices 1-4), and routing logic 206 to route communications to and from the respective slices based on how the address associated with each communication is located within the slices 1-4. Each slice represents a corresponding "slice" of the distribution of addresses used by the L2 caches 131-134. Each slice also represents corresponding "slice" of the shadow tag memory 146. Thus, as there are four slices in this example, each of slices 201-204 stores a corresponding 25% of the address space of the L2 caches 131-134 and a corresponding 25% of the entries of the shadow tag memory 146. To this end, as shown by the detailed view of slice 201, each slice includes an L3 data/tag slice 208, a shadow tag slice 210, and a slice controller 212. For slice 201, the L3 data/tag slice 208 has data and tag array entries for the first 25% of the L2 cache address range, whereas for slice 202 this is for the second 25% of the L2 cache address range, and so on. Similarly, for slice 201 the shadow tag slice 210 includes the first 25% of the indices of the shadow tag memory 146, for slice 202 the shadow tag slice 210 includes the second 25% of the indices of the shadow tag memory 146, and so on.

FIG. 2 also depicts an example arrangement of the shadow tag memory 146 in further detail. As noted, the shadow tag memory 146 is stored as a set of shadow tag slices 210, each having a corresponding portion of the overall address range that is associated with the shadow tag memory 146. Thus, each shadow tag slice 210 includes a plurality of banks, indices and ways. The number of banks in each shadow tag slice 210 corresponds to the number of L2 caches. Thus, because there are four L2 caches 131-134 in the example of FIG. 1, each shadow tag slice 210 includes four banks 221, 222, 223, 224 associated with L2 caches 131, 132, 133, 134, respectively, in this example. The associativity (that is, the number of ways) of a bank is the same as the associativity of the L2 cache associated with that bank. For example, if the L2 cache is eight-way associative, then each bank of the shadow tag memory 146 is also eight-way associative, that is, has eight ways. Conversely, if the L2 cache is direct mapped, then each bank of shadow tag memory 146 is also direct mapped; that is each bank effectively is a one-way set associative cache. A particular combination of index and way in a given bank represents a shadow tag entry 216 that tracks a corresponding cacheline that is present in L2 cache. Each entry of the shadow tag memory 146 has an address field 214 to store at least a portion of an address (typically the upper bits of the physical address) of the cacheline associated with the entry 216 and a state field 215 to store state information for the cacheline. The state and address information stored in a corresponding entry 216 of the shadow tag memory 146 for a cacheline of an L2 cache typically reflects at least a subset of the tag information stored in the tag array of the L2 cache for that cacheline, and thus "shadows" the L2 cache's tag for this cacheline. As such, the state information in the shadow tag memory 146 of the L3 cache 140 may be viewed as "shadow tags" of the counterpart cacheline tags in the L2 caches 131-134.

Table 1 below illustrates an example format and utilization of the shadow tag memory location 216 so as to represent the state information for a corresponding L2 cacheline.

TABLE 1

Shadow tag memory location Format

| Field Name | No. of Bits | Description |
|---|---|---|
| Valid | 1 | Indicates a valid entry. |
| L2State[3:0] | 4 | The coherency state of the cacheline cached at the associated L2 cache. |
| L3Alloc[1:0] | 2 | L3 allocation property for L2-victims- used to indicate if L2-victim should be cached in L3 or not. |
| | | Value     Meaning |
| | | 00     Do not install L2-victim in L3. Treat these as L3-victim instead. |
| | | 01     Install L2-victim in L3. |
| | | 10     Install L2-victim in L3. |
| | | 11     Install L2-victim in L3. |
| L2Tag[31:0] | 32 | The tag portion of the address of the cacheline cached in the corresponding L2 cache. |

Thus, as shown by Table 1 the state information stored in the shadow tag entry 216 associated with a particular cacheline at a particular core/L2 cache includes not only a copy of the tag portion of physical address of the cacheline at this L2 cache, but also coherency state information for the cacheline, as well as allocation information to facilitate handling of eviction of the cacheline from the L2 cache.

Figure 3:
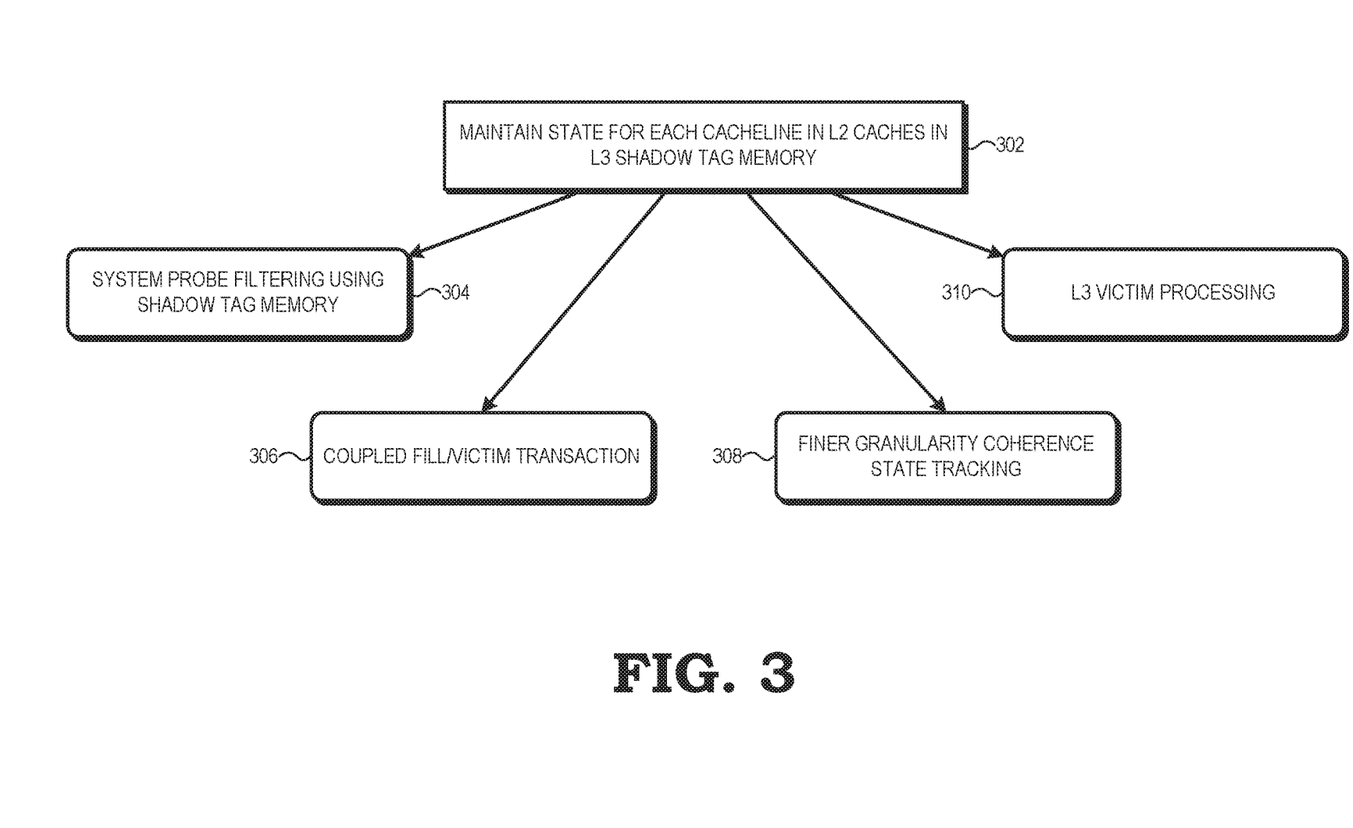
FIG. 3 is a flow diagram illustrating processes for implementing a shadow tag memory to improve caching performance in accordance with some embodiments.

FIG. 3 illustrates the general operation and use of the shadow tag memory 146 of the L3 cache 140 in accordance with some embodiments. As illustrated by block 302, the L3 controller 142 monitors the operation of the L2 caches 131-134 (via, e.g., a coherence bus or other snoop mechanism) so as to identify changes in state for cachelines at the L2 caches 131-134 and update the shadow tag memory 146 accordingly. To illustrate, when a new cacheline is brought into the L2 caches 131-134, the L3 controller 142 identifies which of slices 201-204 is associated with the physical address of the cacheline, identifies an index and a way of the shadow tag slice 210 of the identified slice, and updates the shadow tag entry 216 at the bank corresponding to the L2 cache to reflect the addition of this cacheline to the L2 cache. Similarly, when the state of a cacheline changes at the L2 caches 131-134, the L3 controller 142 identifies which of the slices 201-204 is associated with the cacheline, and then updates one shadow tag entry 216 at the bank corresponding to the L2 cache at the shadow tag slice 210 of this identified slice to reflect the updated status of the cacheline. Eviction of a cacheline from the L2 caches 131-134 likewise triggers the L3 controller 142 to evict the cacheline from the shadow tag memory 146.

In some embodiments, the cache hierarchy 104 maintains the L2 and L3 caching levels as exclusive caches—that is, a cacheline present in one of the L2 caches 131-134 will not be present in the L3 cache 140, and vice versa. However, by maintaining, in effect, tag or other state information at the shadow tag memory 146 of the L3 cache 140 for cachelines resident in the L2 caches 131-134 but without maintaining any of the L2 cachelines at the L3 cache 140, the result is a hybrid approach whereby the L2 and L3 caching levels are data exclusive, but tag "inclusive". That is, by maintaining state information for the L2 cachelines in the shadow tag memory 146, the L3 cache 140 has visibility into the states of the L2 caches 131-134, and the coherency state of the data stored therein, without having to store any of the actual data associated with the cachelines of the L2 caches 131-134. This L3-level insight into the cacheline status of the L2 caches enables a number of advantageous operations.

To illustrate, as represented by block 304, because the L3 cache 140 has information regarding which cachelines are stored at the L2 caches 131-134 (and the statuses of these cachelines), the L3 cache 140 is well-suited to serve as a probe filter for cache probes to cachelines submitted by the memory controller 106, the southbridge 108, or other components of the processing system 100 outside of the compute complex 102. This probe filtering process is described in greater detail below with reference to FIG. 4. As another example, as represented by block 306 the shadow tag information at the L3 cache 140 permits the L3 cache 140 to implement L2 fill requests that also have an associated L2 cacheline eviction request (hereinafter, an "L2 victim request") as a combined request that avoids many of the pitfalls of handling both such requests in a conventional cache system. An example of this is described in greater detail below with reference to FIG. 5. As yet another example, block 308 represents a process by which the shadow tag memory 146 at the L3 cache 140 is used to track the coherency of the L2 cachelines with a finer granularity than applied at the L2 caches 131-134, which reduces the number of system-level cache probes and thus improves overall system performance. Examples of this finer-granularity coherency state tracking are described below with reference to FIGS. 6 and 7. Further, block 310 represents a process by which the shadow tag memory 146 facilitates L3 victim processing, as described in greater detail below with reference to FIG. 8.

Figure 4:
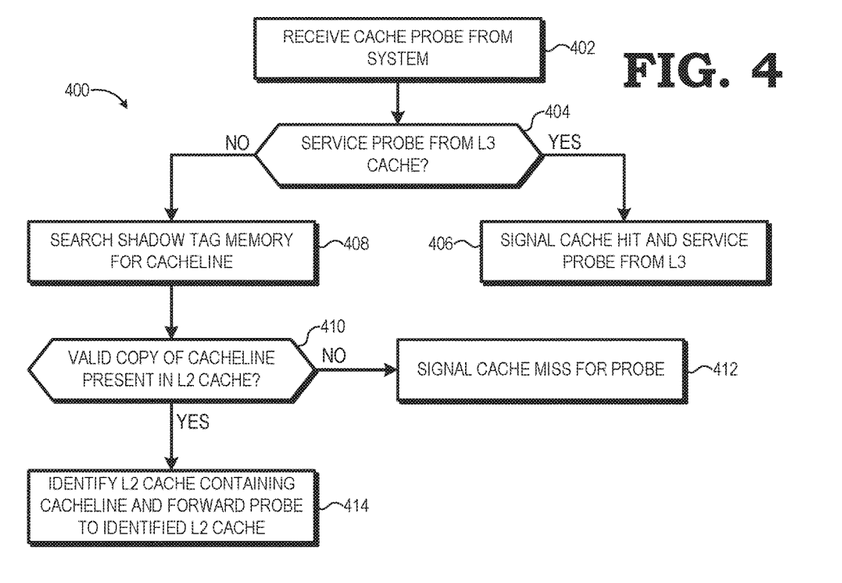
FIG. 4 is a flow diagram illustrating a process for filtering cache probes using a shadow tag memory in accordance with some embodiments.

FIG. 4 illustrates a probe filter method 400 implemented by the L3 cache 140 using the shadow tag memory 146 in accordance with at least one embodiment. In a cache hierarchy, such as the cache hierarchy 104 of the processing system 100, cache probes are used to obtain cached data, inquire as to a state of cached data, change a state of cached data, or otherwise manipulate the cached data by potentially invalidating the cacheline from the cache. Cache probes that originate outside of the compute complex 102 (that is, the processor cores 111-114, the L1 caches 121-124, and the L2 caches 131-134) or the L3 cache 140 are referred to herein as "system cache probes." These system cache probes may arrive from, for example, a different compute complex of the processing system 100 via the memory controller 106, from a peripheral device 120 via the southbridge 108, and the like. Typically, such system cache probes propagate from the lowest level in the cache hierarchy (which is the L3 caching level in this example). Accordingly, probe filter method 400 illustrates the probe filter process for such system cache probes.

The method 400 initiates at block 402 with the receipt of a system cache probe by the L3 controller 142. In response to the cache probe, at block 404 the L3 controller 142 checks the tags of the L3 data/tag array 144 to determine whether a valid copy of the cacheline requested by the cache probe is present in the L3 cache 140 (that is, whether the cache probe hits on the L3 cache 140). If a valid copy of the requested cacheline is present in the L3 cache 140, at block 406 the L3 controller 142 signals a cache hit and services the cache probe from the L3 cache 140.

Otherwise, if a valid copy of the requested cacheline is not present in the L3 cache 140, at block 408 the L3 controller 142 searches the state information of the shadow tag memory 146 to determine whether at least one of the L2 caches stores a valid copy of the requested cacheline. At block 410 the L3 controller 142 analyzes the results of the search. In the event that the search of the shadow tag memory 146 reveals that none of the L2 caches 131-136 contain a valid copy of the requested cacheline, at block 412 the L3 controller 142 signals a cache miss in response to the cache probe. With this cache miss, the memory controller 106 initiates a memory access to obtain the requested cacheline from the system memory 116. Otherwise, if the search of the shadow tag memory 146 reveals that at least one L2 cache has a valid copy of the requested cacheline, at block 414 an L2 cache having a valid copy is selected (in the event that there is more than one L2 with a valid copy) and the L3 controller 142 forwards the cache probe to the selected L2 cache. When there are two or more L2 caches having a valid copy of the requested cacheline, the L3 controller selects one of the L2 caches 131-134 for servicing the cache probe based on a comparison of coherency states of the two or more L2 caches as represented in the shadow tag memory 146. To illustrate, an L2 cache having a Forward (F) or Owned (O) coherency state represented in the shadow tag memory 146 for the requested cacheline is preferentially selected over the other L2 caches having a valid copy of the requested cacheline.

Thus, as method 400 illustrates, because the shadow tag memory 146 enables the L3 controller 142 to know which cachelines are present and valid in the L2 caches 131-134, in some embodiments the L3 controller 142 preemptively signals a cache miss to system cache probes for cachelines not present (that is, not valid) in the L2 caches 131-134, and thus filter out cache probes that otherwise would have been broadcast to the L2 caches and returned with a L2 "cache miss," indicating the absence of the cacheline in the L2 cache.

Figure 5:
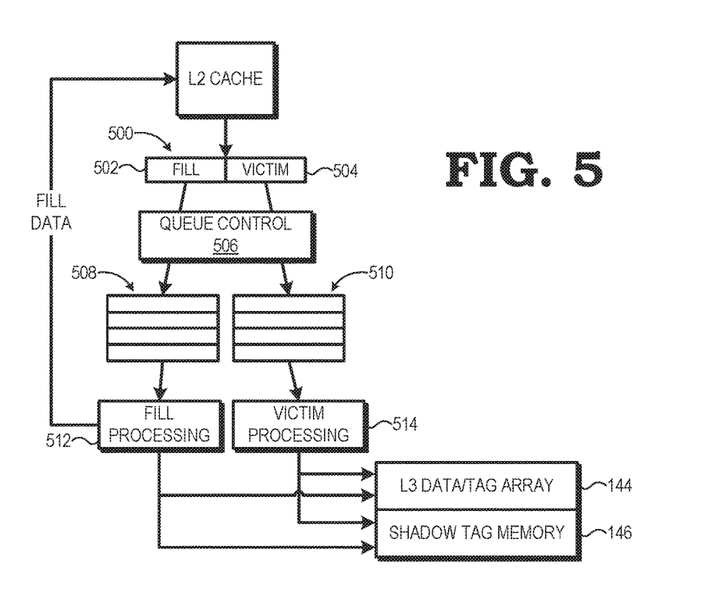
FIG. 5 is a diagram illustrating a process for coupled fill/victim requests using a shadow tag memory in accordance with at least some embodiments.

FIG. 5 illustrates a process for processing a coupled fill/victim transaction at the L3 cache 140 using the shadow tag memory 146 in accordance with some embodiments. As explained above, the L2 tag and state bits for a cacheline resident in an L2 cache is maintained at the corresponding shadow tag entry 216 located at the index associated with the cacheline and the way associated with the L2 cache. When the L2 cache sends a fill request to a particular L2 index and way, the fill request, depending on circumstances, triggers a capacity victim request at the same L2 index and way. The state update of the shadow tag memory 146 for this pair of requests (that is, the fill request paired with the capacity victim request) could introduce unintended operations if the fill request and victim request are sent from the L2 cache to the L3 cache as separate requests. The reason for this is that the queue implemented by the L3 cache to buffer such requests might accept the fill request and not have any more free entries to accept the capacity victim request from the L2 cache. The handling of the fill request and victim request independently (without both being resident in the request queue) can lead to issues in updating the shadow tag memory 146 at the L2 index and way. As one example, if the fill request is completed while the capacity victim request remains unprocessed, a probe to the address of the victim cacheline will miss in the shadow tag memory 146, and thus the L3 controller will think that the L2 caches do not have a copy of the victim cacheline. As another example, if the fill request is processed while the capacity victim request remains unprocessed and the tag of the cacheline that is subject of the fill request has not yet been stored to the shadow tag memory 146, a probe to the address of the fill cacheline will miss in the shadow tag memory 146, and thus the L3 controller will think that the L2 caches do not have a copy of the fill cacheline.

To avoid such issues, in at least one embodiment, the cache hierarchy 104 may be configured so that the L2 caches 131-134 issue fill requests that have a resulting capacity victim request as a coupled fill/victim request 500 that includes both a fill request 502 and a corresponding victim request 504 as a single request packet provided to the L3 controller 142. A queue controller 506 of the L3 controller 142 identifies the coupled fill/victim request 500 as such, and thus enqueues the coupled fill/victim request 500 as two separate entries, with the fill request 502 being enqueued in a fill request queue 508 and the victim request being enqueued in a write request queue 510. To ensure successful enqueuing, the queue controller 506 does not enqueue either request until it is confirmed that both queues 508, 510 have at least one open entry. By receiving both requests 502, 504 in a single request packet, and by ensuring that both requests are enqueued only when there is room for each in their respective queues, any instance in which the fill request 502 is queued while the victim request 504 is dropped is avoided. As such, the fill request 502 and the victim request 504 each can independently update the shadow tag memory 146.

To illustrate, if the fill request 502 is accessed from the queue 508 and performed (as represented by fill processing 512) before the victim request 504 (for example, in the case of an L3 hit), in processing the fill request 502 the L3 controller 142 can overwrite the victim tag at the shadow tag entry 216 that is indexed by the L2 index and way in the shadow tag memory 146. This is acceptable as any probe to the victim address in this time period would now interlock with the outstanding victim request 504 in the queue 510. Conversely, if the victim request 504 is accessed from the queue 510 and performed (as represented by victim processing 514) before the fill request 502, it would be acceptable to clear out the tag information for the victim cacheline at the corresponding index and way of the shadow tag memory 146 even though the tag information for the fill cacheline has not yet been written to the same location in the shadow tag memory 146.

In addition to facilitating effective probe filtering and accurate coupled fill/victim request processing, in some embodiments the shadow tag memory 146 enables the L3 cache 140 to provide enhanced coherency operations for the cachelines stored at the L2 caches 131-134. To this end, in some embodiments the L3 cache 140 implements a cache coherency protocol that is a superset of the cache coherency protocol implemented by the L2 caches 131-134. For example, the L2 caches 131-134 implement a MOESI (Modified-Owned-Exclusive-Shared-Invalid) coherency protocol, whereas the coherency states maintained by the L3 controller in the shadow tag memory 146 for the L2 caches 131-134 include, for example, the MOESI protocol along with additional coherency states that enable the L3 controller to, for example, more efficiently process internal and system cache probes, while permitting the L2 caches 131-134 to use a less complex coherency protocol, and thus requiring less complex implementation of the L2 caches 131-134 and less complex communications between the L2 caches 131-134 of the same compute complex 102.

Figure 6:
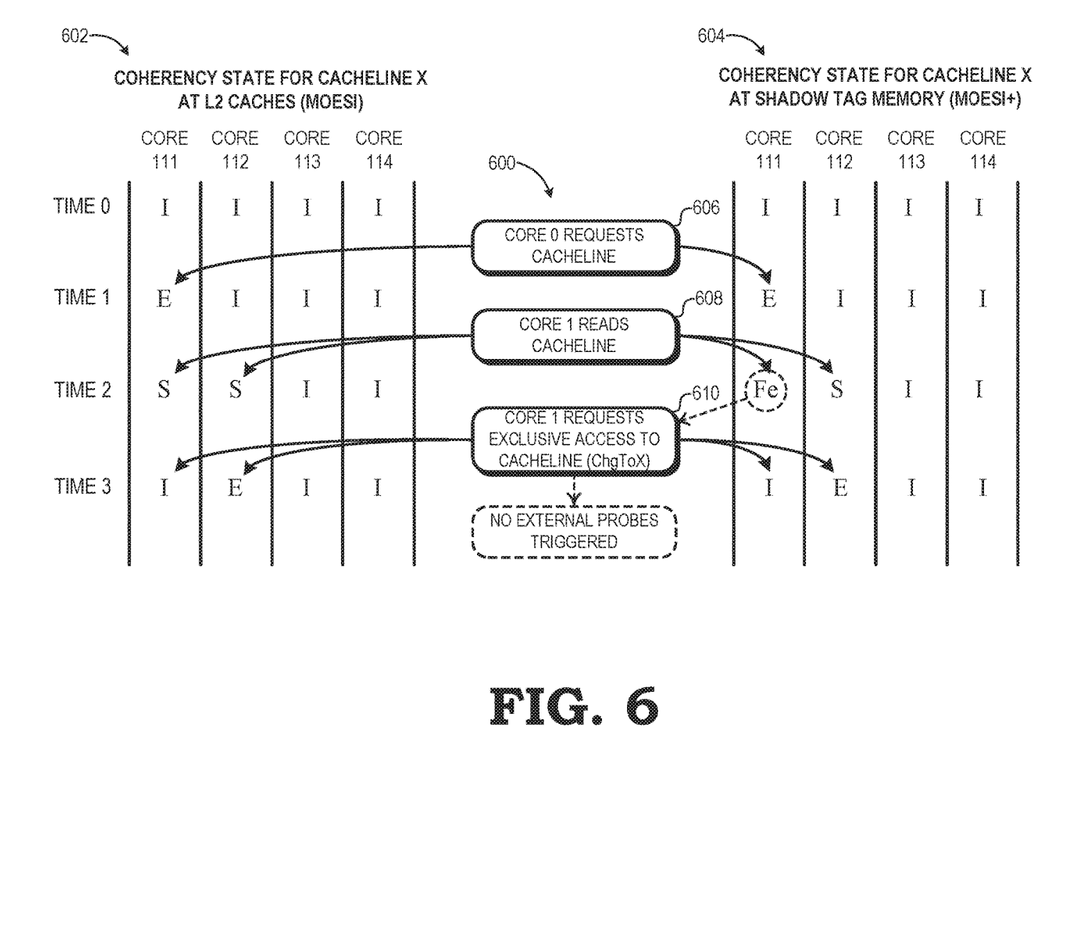
FIG. 6 is a diagram illustrating an example utilization of a Forward with Exclusive (Fe) coherency state using a shadow tag memory in accordance with some embodiments.
Figure 7:
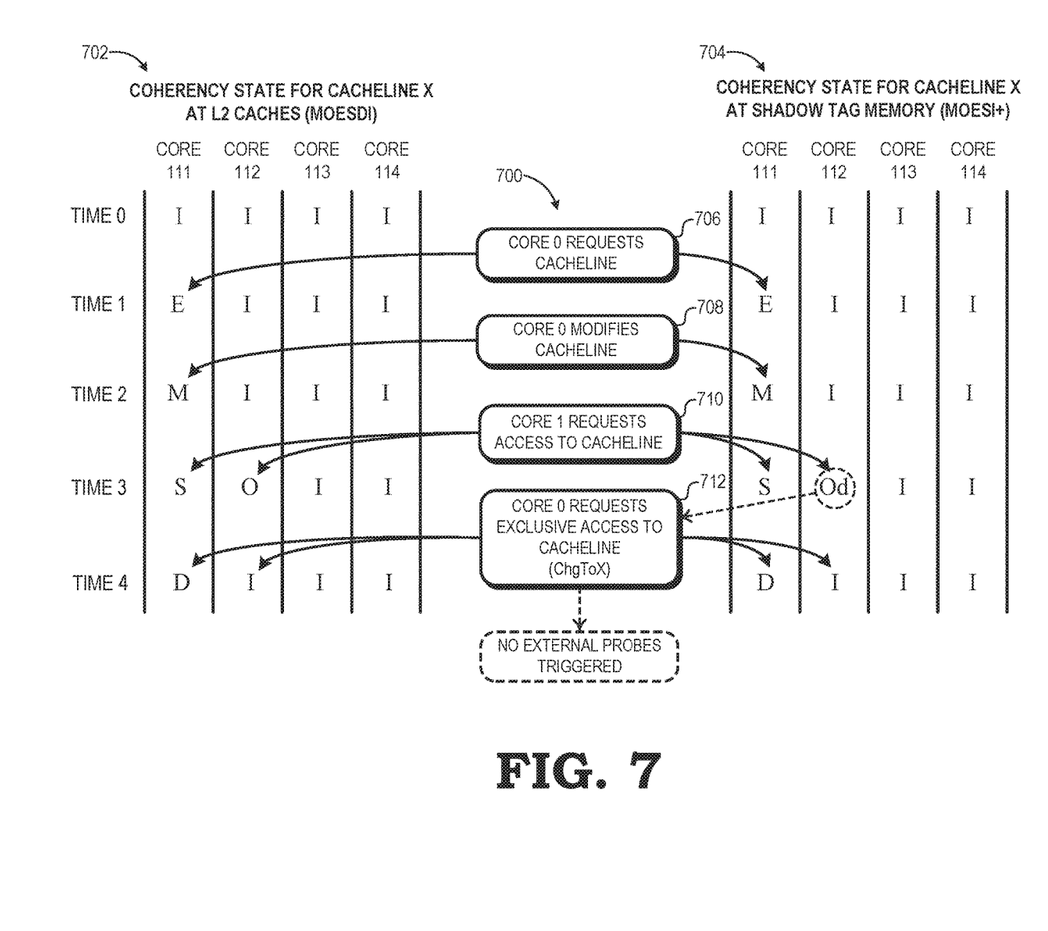
FIG. 7 is a diagram illustrating an example utilization of an Owned Dirty (Od) coherency state using a shadow tag memory in accordance with some embodiments.

FIGS. 6 and 7 illustrate two such examples of the superset coherency protocol implementation for the shadow tag memory 146. In particular, FIGS. 6 and 7 depict the use of additional coherency states that permit the L3 controller 142 to recall that a particular cacheline is exclusive in nature from a coherency point of view or from the point of view of the memory controller 106, while still permitting the cacheline to be shared internally within the compute complex 102 in a manner that avoids certain probes to the larger system when one of the cores requests exclusive access to the cacheline.

FIG. 6 illustrates an example implementation in which the L3 cache 140 implements an additional coherency state, denoted "Forward with exclusive" or "Fe" at the shadow tag memory 146. The Fe state is used at the shadow tag memory 146 to record or otherwise remember that a processor core had exclusive access to a corresponding cacheline before that cacheline was shared with another core in the same compute complex 102, and thus enabling the L3 controller 142 to handle any requests for exclusive access to that cacheline by another core (such requests referred to herein as a Change to Exclusive, or ChgToX, request) internally—that is, without necessitating probes to the system at large.

To illustrate by way of example, FIG. 6 depicts a sequence 600 of cache access operations involving a particular cacheline (denoted "cacheline X"). The coherency state maintained for cacheline X at each of the L2 caches 131-134 as the sequence 600 progresses is represented by the lane chart 602 on the left. The coherency state maintained for cacheline X in the corresponding shadow tag entries 216 for each of the L2 caches 131-134 at the shadow tag memory 146 as the sequence 600 progresses is represented by the lane chart 604 on the right. For purposes of this example, the L2 caches 131-134 utilize the MOESI coherency protocol, whereas the shadow tag memory 146 utilizes the Fe coherency state in addition to the M, O, E, S, and I coherency states of the MOESI coherency protocol (that is, "MOESI+").

At time 0, cacheline X is not validly present in any of the L2 caches 131-134, and thus the coherency status for cacheline X is marked I (invalid) in both the corresponding tags of the L2 caches 131-134 and in the corresponding shadow tags (that is, in shadow tag entries 216) of the shadow tag memory 146. At time 1, the L2 cache 131 associated with processor core 111 issues a fill request 606 for cacheline X, and after processing of the fill request has completed, the L2 cache 131 changes the coherency state for cacheline X from "I" (invalid) to "E" (exclusive), and thus recording the fact that a new cacheline has been installed in the L2 cache 131. Further, the L3 controller 142 notes this response sent to request 606 and updates the shadow tag entry 216 of the shadow tag memory 146 for cacheline X and L2 cache 131 to also reflect the E coherency state.

At time 2, processor core 112 issues a read request for cacheline X, which in turn triggers the L2 cache 132 associated with processor core 112 to issue a fill request 608 for cacheline X. In response, the L3 controller 142 processes the fill request by searching the shadow tag memory 146 and identifies a "hit" in the shadow tag memory 146 indicating that the L2 cache 131 has a copy of this cacheline. In response, the L3 controller 142 sends a probe request to L2 cache 131 and satisfies the fill request 608 by responding with the cacheline data back to L2 cache 132. This results in L2 cache 131 sharing its copy of the cacheline X, and the coherency controller at the L2 caching level changes the coherency states for the cacheline X at the L2 caches 131, 132 both to the "S" (shared) coherency state. The L3 controller 142 has to update the two shadow tag memory locations; one corresponding to the cacheline X being present in L2 cache 131 and one corresponding to the cacheline X that was just sent to L2 cache 132. However, rather than changing corresponding coherency states in the shadow tag memory 146 at both these locations to the "S" state, the L3 controller 142 recognizes that the coherency state for core 111 for cacheline X was "E" at the time of this operation, and thus changes the "E" coherency state to the "Fe" coherency state for the L2 cache 131. As processor core 112 did not have the "E" coherency state at the time of this change, the L3 controller 142 changes the coherency state for cacheline X to "S" for the L2 cache 132 in the shadow tag memory 146 to indicate that L2 cache 132 is sharing the cacheline X.

Subsequently, at time 3 processor core 112 issues a request to obtain exclusive access to cacheline X, which in turn triggers the L2 cache 132 to issue a ChgToX request 610. As shown by the coherency states in lane chart 602 at this point, the L2 caches 131, 132 have "S" states for cacheline X, and caches 133 and 134 have "I" states for cacheline X. As such, from the L2 coherency states none of the L2 caches appears to have exclusive access to cacheline X at the time that the ChgToX request 610 is issued. As such, in a conventional system, the ChgToX request 610 would have to be propagated to the memory controller 106, which would then broadcast back probes into any other compute complexes in the processing system 100 to determine whether a valid copy of cacheline X is present elsewhere, and if so, invalidate any such copies so that processor 1 can obtain exclusive access to cacheline X. This process thus results in considerable probe traffic throughout the system 100. However, the expanded L2 coherency state tracking afforded by the shadow tag memory 146 at the L3 cache 140 can reduce or eliminate such probe traffic.

To illustrate, because the L3 controller 142 marked the coherency state of cacheline X for L2 cache 131 as Fe in the shadow tag memory 146, the L3 controller 142 is able to recognize that the processor core 111/L2 cache 131 had exclusive access to cacheline X before it was shared within the compute complex 102 (that is, shared with processor core 112/L2 cache 132). From this information, it follows that cacheline X was not shared outside of the compute complex 102, and thus no valid copy of cacheline X is present outside of the compute complex 102. As such, in response to detecting the Fe coherency state for cacheline X in the shadow tag memory 146, the L3 controller 142 is able to signal to the L2 cache 132 that the L2 cache 132 can have exclusive access to cacheline X without the need to forward the ChgToX request 610 to the memory controller 106 and thus avoid the triggering of one or more external probes to find and invalidate copies of the cacheline X outside of the compute complex 102. In response to this signaling, the L2 caches 131, 132 update their respective tags to reflect a change in coherency state for cacheline X to states "I" and "E", respectively. The L3 controller 142 likewise makes the same change to the coherency states for the L2 caches 131, 132 in the shadow tag memory 146. Thus, as demonstrated above, by using the Fe coherency state in the shadow tag memory 146 to identify a core/L2 cache that had exclusive access to a cacheline before it was shared within the compute complex 102, external probing can be reduced or eliminated when another core in that same compute complex 102 subsequently requests exclusive access.

FIG. 7 illustrates an example implementation in which the L3 cache 140 utilizes an additional coherency state, denoted "Owned-dirty" or "Od" at the shadow tag memory 146. Like the Fe state, in some embodiments the Od state is used at the shadow tag memory 146 to record or otherwise remember that a processor core had exclusive access to a modified, or "dirty" copy of the cacheline shared with another core in the same compute complex 102, and thus enabling the L3 controller 142 to handle any requests for exclusive access to that cacheline by another core (such requests referred to herein as a Change to Exclusive, or ChgToX, request) internally—that is, without necessitating probes to the system at large.

To illustrate by way of example, FIG. 7 depicts a sequence 700 of cache access operations involving a particular cacheline (denoted "cacheline X"). The coherency state maintained for cacheline X at each of the L2 caches 131-134 as the sequence 700 progresses is represented by the lane chart 702 on the left. The coherency state maintained for cacheline X in the corresponding shadow tag entries 216 for each of the L2 caches 131-134 at the shadow tag memory 146 as the sequence 700 progresses is represented by the lane chart 704 on the right. In this example, the L2 caches 131-134 utilize the MOESDI coherency protocol, whereas the shadow tag memory 146 utilizes the Od coherency state in addition to the M, O, E, S, and I coherency states of the MOESI coherency protocol (that is, "MOESI+").

At time 0, cacheline X is not validly present in any of the L2 caches 131-134, and thus the coherency status for cacheline X is marked I (invalid) in both the corresponding tags of the L2 caches 131-134 and in the corresponding shadow tags (that is, in shadow tag entries 216) of the shadow tag memory 146. At time 1, the L2 cache 131 associated with processor core 111 issues a fill request 706 for cacheline X, and after processing of the fill request has completed, the L2 cache 131 changes the coherency state for cacheline X to "E" (exclusive). Further, the L3 controller 142 notices this response sent to request 606 and the L3 controller 142 updates the shadow tag memory location 216 of the shadow tag memory 146 for cacheline X and L2 cache 131 to also reflect the E coherency state.

At time 2, processor core 111 issues a write request 708 that modifies the copy of cacheline X resident in the L2 cache 131. In response, the processing system 100 changes the coherency state of cacheline X in the L2 cache 131 to the "M" (Modified) coherency state. Likewise, in response to detecting the modification to cacheline X at the L2 cache 131, the L3 controller 142 updates the shadow tag memory 146 to reflect the "M" coherency state for cacheline X at the L2 cache 131.

At time 3, processor core 112 issues a read request for cacheline X, which in turn triggers the L2 cache 132 associated with processor core 112 to issue a fill request 710 for cacheline X. In response, the L3 controller 142 processes the fill request by searching the shadow tag memory 146 and identifies a "hit" in the shadow tag memory 146 indicating that the L2 cache 131 has a copy of this cacheline. In response, the L3 controller 142 sends a probe request to L2 cache 131 and satisfies the fill request 608 by responding with the cacheline data back to L2 cache 132. This results in L2 cache 131 sharing its dirty copy of the cacheline X with the L2 cache 132, and the coherency controller at the L2 caching level changes the coherency states for the cacheline X to the "S" (Shared) coherency state for L2 cache 131 and the "O" (Owned) coherency state for L2 cache 132. However, rather than likewise changing corresponding coherency states in the shadow tag memory 146 in the same manner, the L3 controller 142 recognizes that the coherency state for core 111 for cacheline X was "M" at the time of this operation, and thus marks cacheline X as having the "Od" coherency state for the L2 cache 132. As such, the shadow tag memory 146 signals that the L2 cache 132 obtained access to a dirty copy of cacheline X from another core in the same compute complex 102.

Subsequently, at time 4 processor core 111 issues a request to obtain exclusive access to cacheline X, which in turn triggers the L2 cache 131 to issue a ChgToX request 712. From the L2 coherency states at this point, it would not be clear whether an exclusive copy of cacheline X is present in any of the L2 caches 131-134. As such, in a conventional system, the ChgToX request 712 would have to be propagated to the memory controller 106, which would then broadcast back probes into any other compute complexes in the processing system 100 to determine whether a copy of cacheline X is present elsewhere, and if so, invalidate the copy so that core 111 in compute complex 102 can obtain exclusive access to cacheline X. This process would result in considerable probe traffic throughout the system 100. However, because the L3 controller 142 marked the coherency state of cacheline X for L2 cache 132 as Od in the shadow tag memory 146, the L3 controller 142 is able to recognize that the processor core 112/L2 cache 132 had exclusive access to cacheline X before sharing the cacheline X with another core/L2 cache in the compute complex 102. From this information, it follows that cacheline X was not shared outside of the compute complex 102, and thus no valid copy of cacheline X is present outside of the compute complex 102. With this information, the L3 controller 142 is able to signal to the L2 cache 131 that the L2 cache 131 can have exclusive access to cacheline X without the need to forward the ChgToX request 710 to the memory controller 106 and thus avoid the triggering of one or more external probes to find and invalidate copies of the cacheline X outside of the compute complex 102. In response to this signaling, the L2 caches 131, 132 update their respective tags to reflect a change in coherency state for cacheline X to states "D" and "I", respectively. The L3 controller 142 likewise makes the same change to the coherency states for the L2 caches 131, 132 in the shadow tag memory 146. Thus, as demonstrated above, by using the Od coherency state in the shadow tag memory 146 to identify a core/L2 cache that had exclusive access to a cacheline before it was shared within the compute complex 102, external probing can be eliminated when another core in that same compute complex 102 subsequently requests exclusive access.

Figure 8:
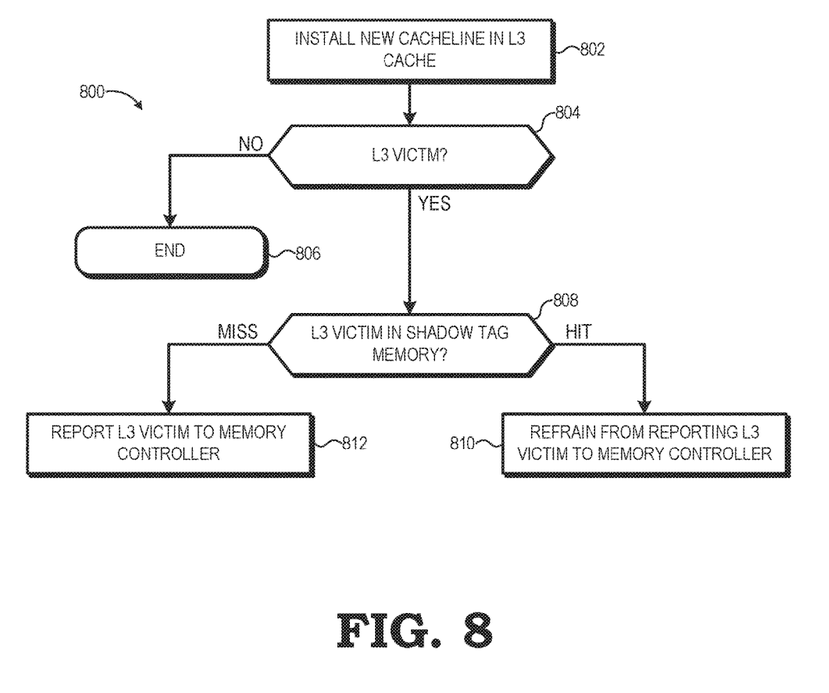
FIG. 8 is a flow diagram illustrating a process for evicting a cacheline from a cache hierarchy to a memory using a shadow tag memory in accordance with some embodiments.

FIG. 8 illustrates a method 800 for efficient processing of cacheline evictions from the cache hierarchy 104 reported to memory controller 106 using the shadow tag memory 146 in accordance with at least one embodiment. At block 802, a new cacheline is received for storage at the L3 cache 140. The installation of a new cacheline in the L3 cache 140 can sometimes result in the eviction of another existing cacheline at the same location from the L3 cache 140. This eviction is termed "L3 victim" for purposes of the following. Accordingly, at block 804 the L3 controller 142 determines whether the new cacheline results in an L3 victim. If not, no L3 victim processing is required, and thus the method 800 terminates. However, if an L3 victim results, L3 victim processing is initiated. In some embodiments, the L2 caches 131-134 are implemented as inclusive caches and thus include all cachelines present in its corresponding L1 caches 121-124. Accordingly, at block 808 the L3 controller 142 searches shadow tag memory 146 to determine whether the same cacheline exists in the shadow tag memory 146. If the L3 victim is in the shadow tag memory 146, the L3 controller 142 gets a "hit" from the search process and thus the L3 controller 142 determines that the cacheline exists in one of the L2 caches 131-134. Accordingly, in response to the hit, at block 810 the L3 controller 142 refrains from any further processing of the L3 victim, including refraining from reporting the L3 victim to the memory controller 106. If, however, a "miss" results from the shadow tag memory search, the L3 controller 142 determines that the cacheline is not present in any of the L2 caches 131-134. Accordingly, in response to a miss at block 812 the L3 controller completes processing of the L3 victim, which includes reporting the L3 victim as an eviction from the cache hierarchy 104 to the memory controller 106. Thus, implementation of the shadow tag memory 146 enables the L3 cache 140 to eliminate requests for L3 victims to be reported to the memory controller 106 as eviction victims in instances where the L3 victim cachelines are present in the L2 caches 131-134, and thus saving power and memory bandwidth in the design.

In some embodiments, the apparatus and techniques described above are implemented in a system comprising one or more integrated circuit (IC) devices (also referred to as integrated circuit packages or microchips), such as the processing system 100 described above with reference to FIGS. 1-8. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device are stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium is implemented in source code, assembly language code, object code, or other instruction format that is interpreted or otherwise executable by one or more processors.

Note that not all of the activities or elements described above in the general description are required, that a portion of a specific activity or device may not be required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system comprising:
    a plurality of processor cores;
    a plurality of private caches, each private cache associated with a corresponding processor core of the plurality of processor cores and comprising a corresponding set of cachelines, the plurality of private caches configured to store coherency states for the cachelines of the corresponding sets of cachelines in accordance with a first set of coherency states; and
    a shared cache shared by the plurality of processor cores, the shared cache comprising:
        a second set of cachelines; and
        a shadow tag memory comprising a plurality of entries, each entry storing state and address information for a corresponding cacheline of the set of cachelines of one of the private caches, the shadow tag memory configured to store coherency states for the cachelines of the sets of cachelines of the plurality of private caches in accordance with a second set of coherency states, the second set of coherency states comprising a superset of the first set of coherency states, wherein the state information comprises coherency states for at least a subset of the cachelines of the plurality of private caches in accordance with the second set of coherency states.

2. The processing system of claim 1, wherein the second set of coherency states includes a coherency state that signals that an associated cacheline was obtained from one of the plurality of private caches that had exclusive access to the associated cacheline.

3. The processing system of claim 1, wherein the second set of coherency states includes a coherency state that signals that an associated cacheline was obtained in modified form from one of the plurality of private caches that had exclusive access to the associated cacheline.

4. The processing system of claim 1, wherein the shared cache further comprises:
    a controller to filter cache probes based on the shadow tag memory.

5. The processing system of claim 4, wherein the controller is to filter cache probes by:
    searching the shadow tag memory to determine whether the shadow tag memory has a valid entry for a cacheline associated with a cache probe; and
    responsive to determining the shadow tag memory does not have a valid entry for the cacheline, signaling a cache miss in response to the cache probe.

6. The processing system of claim 4, wherein the controller is to filter cache probes further by:
    responsive to determining the shadow tag memory has a valid entry for the cacheline, identifying the private cache associated with the valid entry and forwarding the cache probe to the identified private cache.

7. The processing system of claim 1, wherein:
    the plurality of private caches comprises a plurality of level 2 (L2) caches; and
    the shared cache comprises a level 3 (L3) cache.

8. A processing system comprising:
    a plurality of processor cores;

a plurality of private caches, each private cache associated with a corresponding processor core of the plurality of processor cores and comprising a corresponding set of cachelines; and
a shared cache shared by the plurality of processor cores, the shared cache comprising:
a second set of cachelines: and
a shadow tag memory comprising a plurality of entries, each entry storing state and address information for a corresponding cacheline of the set of cachelines of one of the private caches
wherein:
responsive to determining that a fill request for a private cache will result in eviction of a victim cacheline from the private cache, the private cache is to transmit to the shared cache a single request packet that identifies both the fill request to be performed and a victim request to store the victim cacheline that is to be evicted to the shared cache; and
responsive to receiving the single request packet, the shared cache is to buffer the fill request in a fill request queue and to buffer the victim request in a victim request queue.

9. A method in a processing system including a plurality of private caches associated with a plurality of processor cores and a shared cache shared by the plurality of processor cores, the method comprising:
maintaining, at the plurality of private caches, coherency information for cachelines stored at the plurality of private caches in accordance with a first set of coherency states; and
maintaining, at a shadow tag memory of the shared cache, coherency information for the cachelines stored at the plurality of private caches in accordance with a second set of coherency states, the second set of coherency states comprising a superset of the first set of coherency states.

10. The method of claim 9, wherein the second set of coherency states includes a coherency state that signals that an associated cacheline was obtained from one of the plurality of private caches that had exclusive access to the associated cacheline.

11. The method of claim 9, wherein the second set of coherency states includes a coherency state that signals that an associated cacheline was obtained in modified form from one of the plurality of private caches that had exclusive access to the associated cacheline.

12. The method of claim 9, further comprising:
filtering, at the shared cache, cache probes based on the shadow tag memory.

13. The method of claim 12, wherein filtering cache probes comprises:
searching the shadow tag memory to determine whether the shadow tag memory has a valid entry for a cacheline associated with a cache probe; and
responsive to determining the shadow tag memory does not have a valid entry for the cacheline, signaling a cache miss in response to the cache probe.

14. The method of claim 13, wherein filtering cache probes further comprises:
responsive to determining the shadow tag memory has a valid entry for the cacheline, identifying the private cache associated with the valid entry and forwarding the cache probe to the identified private cache.

15. The method of claim 9, further comprising:
responsive to determining that a fill request for a private cache will result in eviction of a victim cacheline from the private cache, transmitting from the private cache to the shared cache a single request packet that identifies both the fill request to be performed and a victim request to store the victim cacheline that is to be evicted to the shared cache; and
responsive to receiving the single request packet, buffering, at the shared cache, the fill request in a fill request queue and buffering the victim request in a victim request queue.

16. The method of claim 9, further comprising:
searching the shadow tag memory to determine whether the shadow tag memory has a valid entry for a cacheline being evicted from the shared cache;
reporting the cacheline as being evicted to a memory controller responsive to determining there is no valid entry for the cacheline; and
refraining from reporting the cacheline as being evicted to the memory controller responsive to determining there is a valid entry for the cacheline.

17. A processing system comprising:
a plurality of private caches, each private cache private to a corresponding processor core of a set of processor cores, each of the private caches configured to store coherency states for cachelines of the corresponding private cache in accordance with a first set of coherency states; and
a shared cache shared by the set of processor cores, wherein the shared cache is maintained as data exclusive relative to the plurality of private caches and tag inclusive relative to the plurality of private caches, wherein the shared cache comprises:
a shadow tag memory that stores, in accordance with a second set of coherency states, state information representative of tag information stored by the plurality of private caches, the second set of coherency states comprising a superset of the first set of coherency states, wherein the state information comprises coherency states for at least a subset of the cachelines of the plurality of private caches.

18. The processing system of claim 17, wherein the second set of coherency states includes a coherency state that signals that an associated cacheline was obtained from one of the plurality of private caches that had exclusive access to the associated cacheline.

19. The processing system of claim 17, wherein the second set of coherency states includes a coherency state that signals that an associated cacheline was obtained in modified form from one of the plurality of private caches that had exclusive access to the associated cacheline.

20. The processing system of claim 17, wherein the shared cache further comprises:
a controller to filter cache probes based on the shadow tag memory.

21. The processing system of claim 20, wherein the controller is to filter cache probes by:
searching the shadow tag memory to determine whether the shadow tag memory has a valid entry for a cacheline associated with a cache probe; and
responsive to determining the shadow tag memory does not have a valid entry for the cacheline, signaling a cache miss in response to the cache probe.

22. The processing system of claim 21, wherein the controller is to filter cache probes further by:
responsive to determining the shadow tag memory has a valid entry for the cacheline, identifying the private cache associated with the valid entry and forwarding the cache probe to the identified private cache.

* * * * *